(12) United States Patent
Seki

(10) Patent No.: US 11,894,790 B2
(45) Date of Patent: Feb. 6, 2024

(54) MOTOR DRIVING CONTROL SUBSTRATE AND MOTOR-DRIVEN OIL PUMP

(71) Applicant: NIDEC TOSOK CORPORATION, Kanagawa (JP)

(72) Inventor: Yusaku Seki, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 602 days.

(21) Appl. No.: 17/120,272

(22) Filed: Dec. 14, 2020

(65) Prior Publication Data

US 2021/0203265 A1 Jul. 1, 2021

(30) Foreign Application Priority Data

Dec. 27, 2019 (JP) ................................ 2019-238197

(51) Int. Cl.
*H02M 1/34* (2007.01)
*H02P 27/06* (2006.01)
*H02P 29/02* (2016.01)
*H02P 29/00* (2016.01)

(52) U.S. Cl.
CPC .............. *H02P 29/00* (2013.01); *H02P 27/06* (2013.01); *H02P 29/02* (2013.01); *H02M 1/34* (2013.01); *H02M 1/348* (2021.05)

(58) Field of Classification Search
CPC .... H02M 1/34–348; H02P 27/06; H02P 29/02
See application file for complete search history.

(56) References Cited

U.S. PATENT DOCUMENTS

| 8,308,442 B2 | 11/2012 | Tsutsui et al. | |
|---|---|---|---|
| 2002/0159281 A1* | 10/2002 | Furukawa ........... | H02M 7/5387 363/132 |
| 2002/0172062 A1* | 11/2002 | Furukawa ............. | B60L 15/025 363/132 |
| 2011/0082630 A1* | 4/2011 | Kawaguchi ......... | F16H 61/0031 477/34 |
| 2013/0069575 A1* | 3/2013 | Hano ...................... | H02P 6/182 318/400.34 |
| 2014/0334203 A1* | 11/2014 | Honda .................. | H02M 7/537 363/56.12 |
| 2018/0254685 A1 | 9/2018 | Seki | |

FOREIGN PATENT DOCUMENTS

| CN | 102045021 A | * | 5/2011 | ............... B60K 1/02 |
|---|---|---|---|---|
| CN | 108336938 A | * | 7/2018 | ............ B60W 10/30 |
| EP | 0838855 B1 | * | 11/2004 | |
| EP | 2383142 A2 | * | 11/2011 | .............. B60L 1/003 |
| EP | 2955733 A1 | * | 12/2015 | .............. F16B 25/00 |
| JP | 2000166254 A | * | 6/2000 | |
| JP | 2004336935 A | * | 11/2004 | |
| JP | 5091521 | | 12/2012 | |

(Continued)

*Primary Examiner* — Sisay G Tiku
(74) *Attorney, Agent, or Firm* — JCIPRNET

(57) ABSTRACT

A control substrate capable of effectively reducing noise input to a plurality of MOSFETs is provided. The control substrate includes at least three parallel snubber circuits (132, 134, and 135). Each of the parallel snubber circuits (132, 133, and 134) is connected in parallel with each of U-phase MOSFETs (126a and 126b), V-phase MOSFETs (127a and 127b), and W-phase MOSFETs (128a and 128b).

2 Claims, 4 Drawing Sheets

(56) References Cited

FOREIGN PATENT DOCUMENTS

| JP | 2016171630 | | 9/2016 |
|----|------------|---|--------|
| JP | 2017082723 A | * | 5/2017 |
| JP | 2018061363 | | 4/2018 |
| JP | 2018148669 | | 9/2018 |
| JP | 2022128588 A | * | 9/2022 |
| WO | 2013132528 | | 9/2013 |

* cited by examiner

1

MOTOR DRIVING CONTROL SUBSTRATE AND MOTOR-DRIVEN OIL PUMP

CROSS-REFERENCE TO RELATED APPLICATION

This application claims the priority benefit of Japan Application No. 2019-238197, filed on Dec. 27, 2019. The entirety of the above-mentioned patent application is hereby incorporated by reference herein and made a part of this specification.

BACKGROUND

Technical Field

The present disclosure relates to a motor driving control substrate and a motor-driven oil pump.

Description of Related Art

Conventionally, motor driving control substrates including a first-phase switching element pair, a second-phase switching element pair, a third-phase switching element pair, and snubber circuits connected in parallel with respective switching element pairs in a three-phase power supply are known.

For example, an inverter substrate is a motor driving control substrate disclosed in Japanese Patent No. 5091521 and includes three switching element pairs and a snubber circuit. Each of the three switching element pairs is provided from two switching elements connected in series. One of the three switching element pairs individually turns on/off a U-phase (for example, a first phase) output in a three-phase power supply using two switching elements. Another one individually turns on/off a V-phase (for example, a second phase) output in the three-phase power supply using two switching elements. The other one individually turns on/off a W-phase (for example, a third phase) output in the three-phase power supply using two switching elements. The snubber circuit is provided from a resistor and a capacitor connected in series and is connected in parallel with each of the three switching element pairs. According to Japanese Patent No. 5091521, an inverter substrate having such a configuration is able to reduce radio noise using the snubber circuits.

Japanese Patent No. 5091521 is an example of related art.

However, the inverter substrate disclosed in Japanese Patent No. 5091521 has the following problem. While noise input to a switching element pair disposed near a snubber circuit among three switching element pairs is able to be reduced, there is a problem in that noise input to the other two switching element pairs cannot be effectively reduced.

It is desirable to provide a motor driving control substrate and a motor-driven oil pump capable of effectively reducing noise input to a switching element pair for each phase.

SUMMARY

According to an exemplary first embodiment of the present application, there is provided a motor driving control substrate including: a first-phase switching element pair including a pair of switching elements connected in series and configured to individually turn on/off outputs of a first phase in a three-phase power supply; a second-phase switching element pair including a pair of switching elements connected in series and configured to individually turn on/off outputs of a second phase in the three-phase power supply; a third-phase switching element pair including a pair of switching elements connected in series and configured to individually turn on/off outputs of a third phase in the three-phase power supply; and snubber circuits connected in parallel with each of the first-phase switching element pair, the second-phase switching element pair, and the third-phase switching element pair, in which at least three snubber circuits are provided, and each of the snubber circuits is connected in parallel with each of the first-phase switching element pair, the second-phase switching element pair, and the third-phase switching element pair.

According to an exemplary second embodiment of the present application, there is provided a motor driving control substrate including: a first-phase switching element pair including a pair of switching elements connected in series and configured to individually turn on/off outputs of a first phase in a three-phase power supply; a second-phase switching element pair including a pair of switching elements connected in series and configured to individually turn on/off outputs of a second phase in the three-phase power supply; a third-phase switching element pair including a pair of switching elements connected in series and configured to individually turn on/off outputs of a third phase in the three-phase power supply; and snubber circuits, in which a first-phase snubber circuit that is connected in parallel with one end of one switching element and the other end of the other switching element in the first-phase switching element pair, a second-phase snubber circuit that is connected in parallel with one end of one switching element and the other end of the other switching element in the second-phase switching element pair, and a third-phase snubber circuit that is connected in parallel with one end of one switching element and the other end of the other switching element in the third-phase switching element pair are included as the snubber circuits.

According to an exemplary third embodiment of the present application, there is provided a motor-driven oil pump including: a pump part; a motor part configured as a drive source of the pump part; and a motor driving control substrate configured to control driving of the motor part, and the motor driving control substrate is the motor driving control substrate according to the first embodiment or the second embodiment.

DESCRIPTION OF THE EMBODIMENTS

Figure 1:
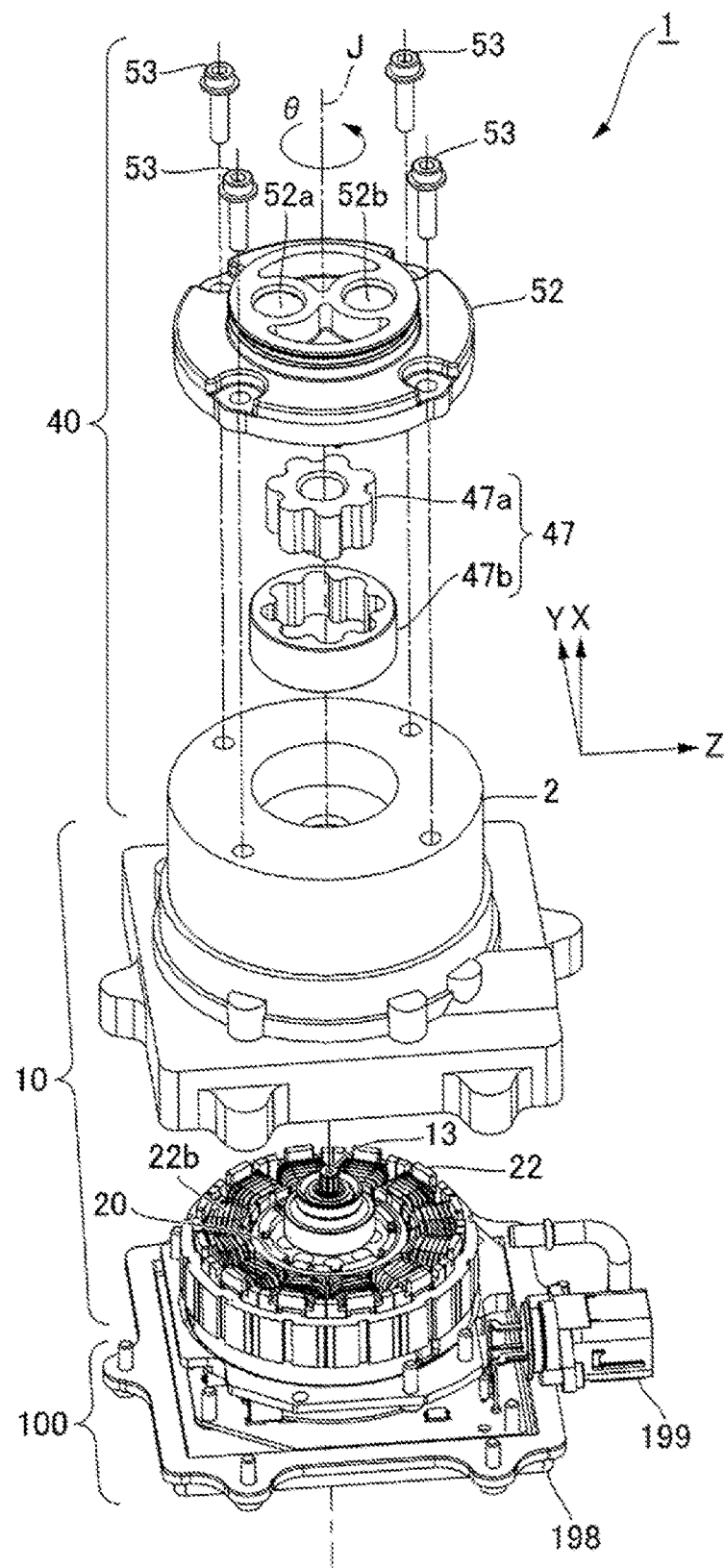
FIG. 1 is a perspective view of a motor-driven oil pump according to an embodiment seen from a +X side.

According to exemplary first, second, and third embodiments of the present application, there is a superior advantage of effectively reducing noise input to a switching element pair for each phase.

Hereinafter, a motor-driven oil pump according to an embodiment of the present disclosure will be described with reference to the drawings. In this embodiment, a motor-driven oil pump mounted in a vehicle such as a car will be described. In the following drawings, in order to allow each component to be easily understood, the scales, the numbers, and the like of structures may be different from those of actual structures.

In the drawings, an XYZ coordinate system is appropriately represented as a three-dimensional orthogonal coordinate system. In the XYZ coordinate system, an X axis direction is a direction that is parallel to an axial direction of a center axis J illustrated in FIG. 1. The center axis J is a central axial line of a shaft (motor shaft) 13 of a motor part 10 to be described below. A Y axis direction is a direction that is parallel to a lateral direction of a motor-driven oil pump illustrated in FIG. 1. A Z axis direction is a direction that is orthogonal to both the X axis direction and the Y axis direction. In any one of the X axis direction, the Y axis direction, and the Z axis direction, a side toward which an arrow illustrated in the drawing is directed will be represented as a "+ side," and a side opposite thereto will be represented as a "− side."

In the following description, the positive side in the X axis direction (+X side) will be referred to as a "front side," and the negative side in the X axis direction (−X side) will be referred to as a "rear side." The rear side and the front side are names that are used for description only and do not limit actual positional relations and directions. Unless otherwise noted, a direction that is parallel to the center axis J (the X axis direction) will be simply referred to as an "axis direction," a radial direction having the center axis J as a center will be simply referred to as a "radial direction," and a circumferential direction having the center axis J as a center, in other words, a direction around the circumference of the center axis J (a θ direction), will be referred to as a "circumferential direction."

In this specification, extending in the axis direction includes the case of extending in a direction inclined with respect to the axis direction in the range less than 45° in addition to the case of extending in the axis direction (the X axis direction) in the strict sense. In addition, in this specification, extending in a radial direction includes the case of extending in a direction inclined with respect to the axis direction in the range less than 45° in addition to the case of extending in the radial direction in the strict sense, in other words, a direction perpendicular to the axis direction (the X axis direction).

<Entire Configuration>

Figure 2:
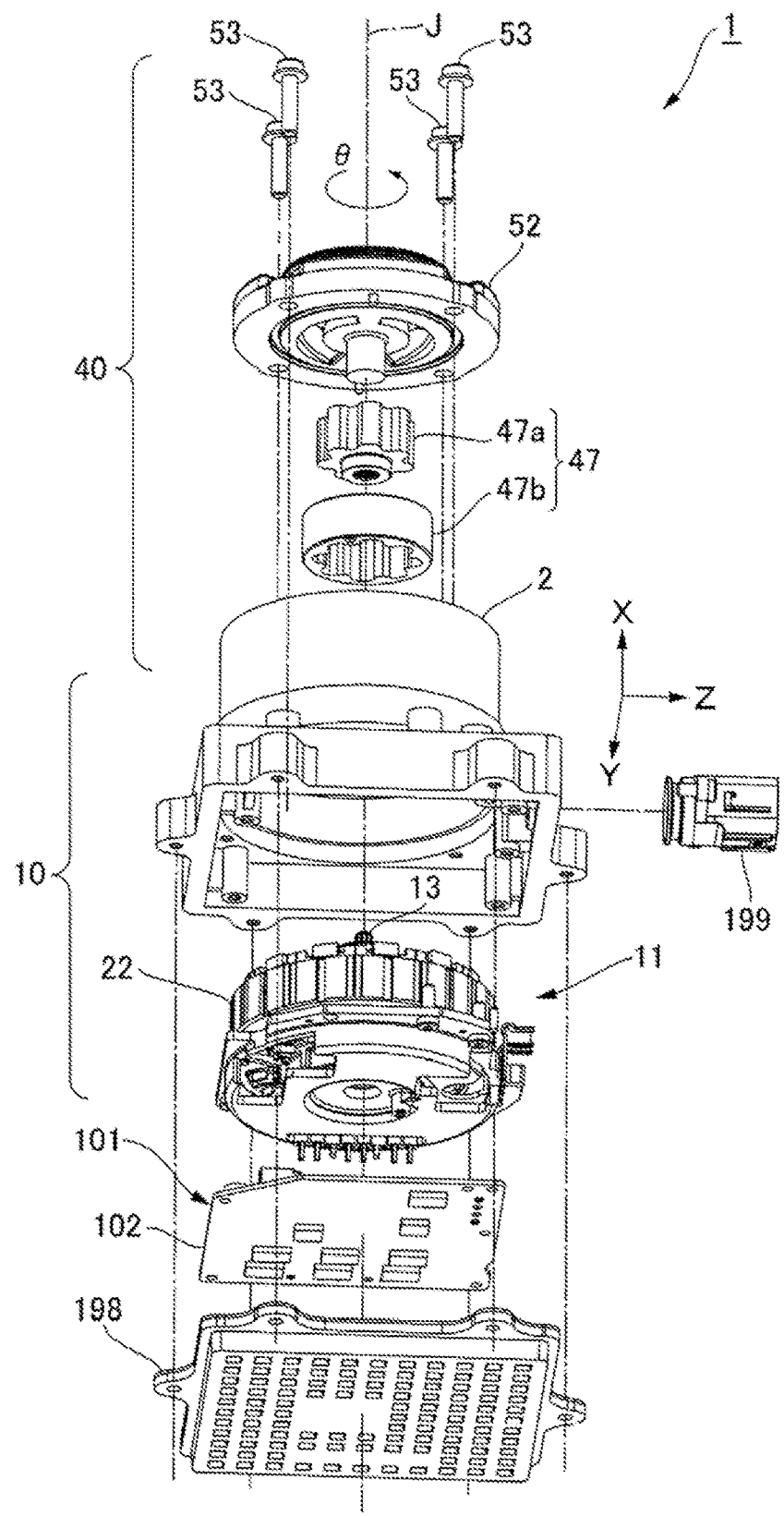
FIG. 2 is a perspective view of the motor-driven oil pump seen from a −X side.

FIG. 1 is a perspective view of a motor-driven oil pump 1 according to an embodiment seen from a +X side. FIG. 2 is a perspective view of the motor-driven oil pump 1 seen from a −X side. As illustrated in FIGS. 1 and 2, the motor-driven oil pump 1 includes a housing 2, a motor part 10, a pump part 40, and an inverter 100.

(Housing 2)

The housing 2 is provided from a casting made of a metal (for example, aluminum). The housing 2 also serves as a motor housing of the motor part 10, a pump housing of the pump part 40, and an inverter housing of the inverter 100. The motor housing of the motor part 10, the pump housing of the pump part 40, and the inverter housing of the inverter 100 are parts of a single member.

A rotor housing part that houses a pump rotor of the pump part 40 and the motor housing of the motor part 10 may be either parts of a single member or separate bodies. In addition, the motor housing of the motor part 10 and the pump housing of the pump part 40 may be separate bodies.

As in the motor-driven oil pump 1 according to the embodiment, in a case in which the motor housing and the pump housing are parts of a single member, a boundary between the motor housing and the pump housing in the axis direction is as defined below. A center of a wall, in which a through hole allowing the shaft to pass through from the inside of the motor housing toward the rotor housing part of the pump housing is provided, in the axis direction is a boundary between the housings in the axis direction.

<Motor Part 10>

The motor part 10 includes a motor 11 inside the motor housing.

(Motor 11)

The motor 11 includes a shaft 13 disposed along the center axis J extending in the axis direction, a rotor 20, and a stator 22.

The motor 11, for example, is a motor of an inner rotor type, the rotor 20 is fixed to an outer circumferential face of the shaft 13, and the stator 22 is disposed on an outer side of the rotor 20 in the radial direction. A part of the motor 11 except for the shaft 13 is a main body part of the motor 11. In other words, the main body part of the motor 11 is configured using the rotor 20, the stator 22, and the like.

The rotor 20 is fixed to an area on a rear side (the other side) of the shaft 13 that is an area on a further front side (one side) than the corner of the rear side. The stator 22 is disposed in a form in which an inner circumferential face faces the outer circumferential face of the rotor 20.

The shaft 13 is a motor shaft, has a front side in the axis direction that protrudes from the corner of the stator 22 on the front side, and is connected to the pump part 40 (in more detail, a pump rotor 47 to be described below).

The stator 22 includes a coil 22b. When the coil 22b becomes conductive, the rotor 20 rotates together with the shaft 13.

The housing 2 has an opening facing the rear side in the axis direction on the corner on the rear side in the axis direction. The opening described above is closed by an inverter cover 198. An operator is able to access a control substrate 101 of the inverter 100 by detaching the inverter cover 198 from the housing 2.

<Pump Part 40>

The pump part 40 is positioned on a front side of the motor part 10 in the axis direction, is driven by the motor part 10 through the shaft 13, and discharges oil. The pump part 40 includes a pump rotor 47 and a pump cover 52.

(Pump Rotor 47)

The pump rotor 47 is attached to a front side of the shaft 13. The pump rotor 47 includes an inner rotor 47a and an outer rotor 47b. The inner rotor 47a is fixed to the shaft 13. The outer rotor 47b surrounds the outer side of the inner rotor 47a in the radial direction.

The inner rotor 47a has a circular ring shape. The inner rotor 47a is a gear having teeth on an outer face in the radial direction. The inner rotor 47a rotates around the axis (in the θ direction) together with the shaft 13. The outer rotor 47b has a circular ring shape that surrounds an outer side of the inner rotor 47a in the radial direction. The outer rotor 47b is a gear having teeth on an inner face in the radial direction. An outer face of the outer rotor 47b in the radial direction has a circular shape.

The gear on the outer face of the inner rotor 47a in the radial direction and the gear on the inner face of the outer rotor 47b in the radial direction are engaged with each other, and the outer rotor 47b rotates in accordance with rotation of the inner rotor 47a accompanying the rotation of the shaft 13. In other words, the pump rotor 47 rotates in accordance with rotation of the shaft 13. The motor part 10 and the pump part 40 have a shaft 13 as a rotation shaft provided from the same member. In accordance with this, an increase in size of the motor-driven oil pump 1 in the axis direction is able to be inhibited.

In addition, in accordance with rotation of the inner rotor 47a and the outer rotor 47b, the volume of an engagement part between the inner rotor 47a and the outer rotor 47b changes. An area in which the volume decreases becomes a pressing area, and an area in which the volume increases becomes a negative-pressure area.

(Pump Cover 52)

The housing 2 has an opening that faces a front side in the axis direction on the corner on the front side in the axis direction. This opening is closed by a pump cover 52. The pump cover 52 is fixed to the housing 2 using a bolt 53. In addition, the pump cover 52 includes a discharge port 52a that faces the above-described pressing area of the pump rotor 47 and a suction port 52b that faces the above-described negative-pressure area of the pump rotor 47.

When the pump rotor 47 rotates, oil inside the pump part 40 is discharged to the outside through the discharge port 52a, and external oil is sucked into the inside of the pump part 40 through the suction port 52b.

<Inverter 100>

The inverter 100 is disposed further on a −X side in the axis direction from the motor part 10 and the pump part 40. The inverter 100 that controls driving of the motor 11 includes a control substrate 101 as a circuit board, an inverter cover 198, and a connector 199.

(Control Substrate 101)

The control substrate 101 is a motor driving control substrate and includes a substrate 102 and a plurality of electronic components mounted in the substrate 102. The substrate 102 includes a plurality of substrate wirings, terminals, lands, through holes, test points, and the like. The control substrate 101 is acquired by mounting a plurality of electronic components in the substrate 102 having such a configuration. In other words, a part acquired by excluding electronic components mounted in the control substrate 101 from the control substrate 101 is the substrate 102. Some of the plurality of electronic components configure a motor driving circuit that has the function of an inverter.

The control substrate 101 is fixed inside the inverter housing with a posture causing a substrate face to be along the Y-axis direction and the Z-axis direction.

(Connector 199)

The connector 199 is connected to a power connector on the vehicle side. The power connector on the vehicle side includes four ports for permanent power supply, GND, signal input, and signal output, is moved from the +Z side to the −Z side in the Z axis direction, and is mounted in the connector 199 by an operator. The connector 199 includes four connector terminals that are individually electrically connected to the four ports described above.

Hereinafter, as one example of the phases in a three-phase power supply, although a first phase, a second phase, and a third phase will be respectively described as a U phase, a V phase, and a W phase, a relation between phase numbers and phase names is not limited to the example described above.

Figure 3:
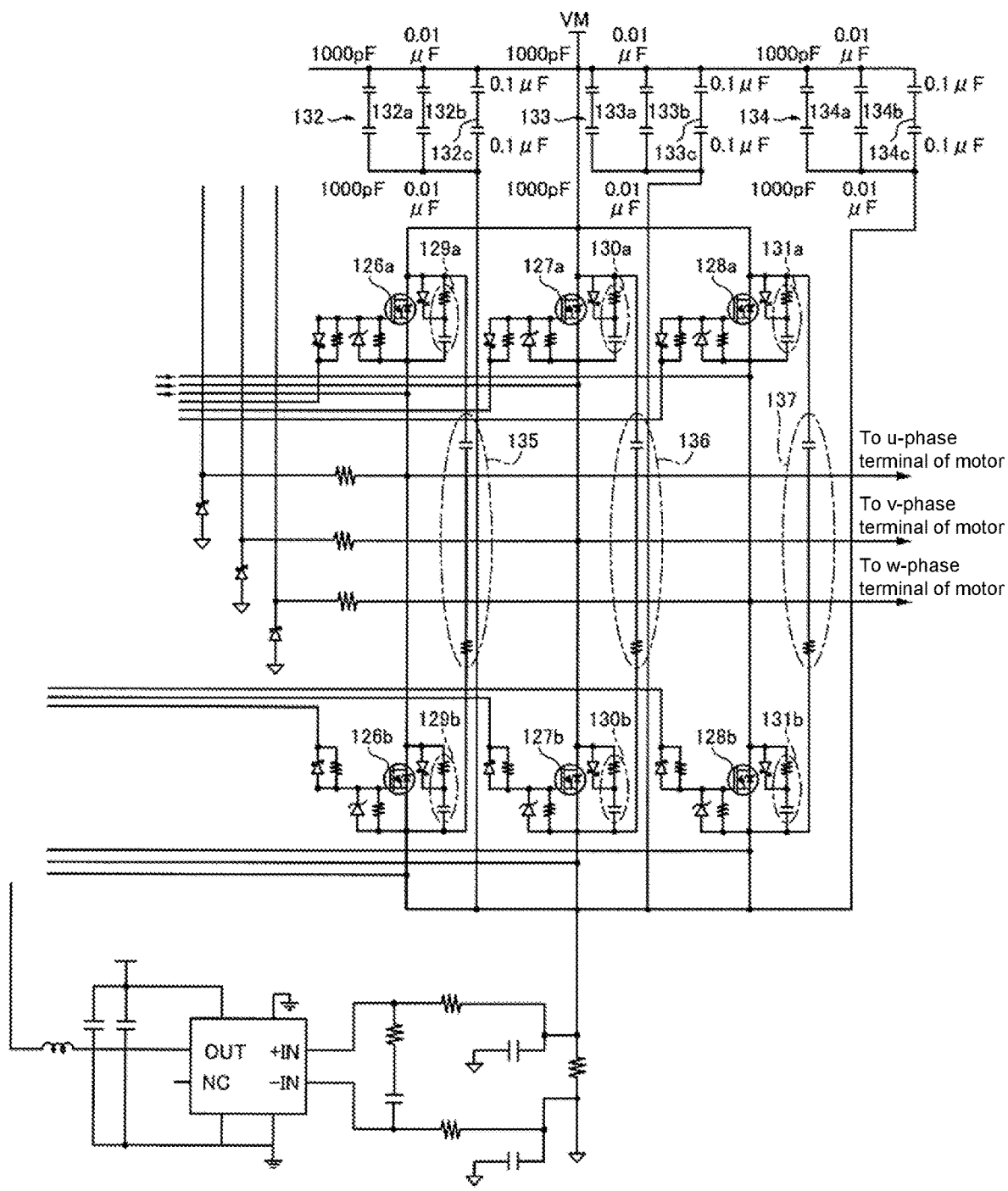
FIG. 3 is a circuit diagram illustrating a part of a circuit of a control substrate in an inverter of the motor-driven oil pump.

FIG. 3 is a circuit diagram illustrating a part of a circuit of the control substrate 101. The control substrate 101 includes three switching element pairs. A first switching element pair is a U-phase switching element pair provided from a U-phase first MOSFET 126a and a U-phase second MOSFET 126b that are connected in series. A second switching element pair is a V-phase switching element pair provided from a V-phase first MOSFET 127a and a V-phase second MOSFET 127b that are connected in series. A third switching element pair is a W-phase switching element pair provided from a W-phase first MOSFET 128a and a W-phase second MOSFET 128b that are connected in series.

A U-phase first snubber circuit 129a used exclusively for reducing noise input to the U-phase first MOSFET 126a is connected in parallel with a drain and a source of the U-phase first MOSFET 126a. The U-phase first snubber circuit 129a includes a resistor and a capacitor connected in series and a diode that is connected in parallel with the resistor.

A U-phase second snubber circuit 129b used exclusively for reducing noise input to the U-phase second MOSFET 126b is connected in parallel with a drain and a source of the U-phase second MOSFET 126b. The U-phase second snubber circuit 129b includes a resistor and a capacitor connected in series and a diode that is connected in parallel with the resistor.

A V-phase first snubber circuit 130a used exclusively for reducing noise input to the V-phase first MOSFET 127a is connected in parallel with a drain and a source of the V-phase first MOSFET 127a. The V-phase first snubber circuit 130a includes a resistor and a capacitor connected in series and a diode that is connected in parallel with the resistor.

A V-phase second snubber circuit 130b used exclusively for reducing noise input to the V-phase second MOSFET 127b is connected in parallel with a drain and a source of the V-phase second MOSFET 127b. The V-phase second snubber circuit 130b includes a resistor and a capacitor connected in series and a diode that is connected in parallel with the resistor.

A W-phase first snubber circuit 131a used exclusively for reducing noise input to the W-phase first MOSFET 128a is connected in parallel with a drain and a source of the W-phase first MOSFET 128a. The W-phase first snubber circuit 131a includes a resistor and a capacitor connected in series and a diode that is connected in parallel with the resistor.

A W-phase second snubber circuit 131b used exclusively for reducing noise input to the W-phase second MOSFET 128b is connected in parallel with a drain and a source of the W-phase second MOSFET 128b. The W-phase second snubber circuit 131b includes a resistor and a capacitor connected in series and a diode that is connected in parallel with the resistor.

The control substrate 101 includes a first parallel snubber circuit 132, a second parallel snubber circuit 133, and a third parallel snubber circuit 134. The three parallel snubber circuits 132, 133, and 134 described above are respectively connected in parallel with the U-phase switching element pairs 126a and 126b, the V-phase switching element pairs 127a and 127b, and the W-phase switching element pairs 128a and 128b.

In the control substrate 101 having such a configuration, as illustrated in the drawing, the first parallel snubber circuit 132 effectively inhibits noise input to the U-phase switching element pairs 126a and 126b at a position close to the U-phase switching element pairs 126a and 126b. In addition, the second parallel snubber circuit 133 effectively inhibits noise input to the V-phase switching element pairs 127a and 127b at a position close to the V-phase switching element pairs 127a and 127b. Furthermore, the third parallel snubber circuit 134 effectively inhibits noise input to the W-phase switching element pairs 128a and 128b at a position close to the W-phase switching element pairs 128a and 128b. Thus, according to the control substrate 101, the following effects are able to be acquired. In other words, noise input to the six MOSFETs 126a, 126b, 127a, 127b, 128a, and 128b is able to be reduced more than in a conventional configuration in which a snubber circuit is disposed at a position far from two switching element pairs among three switching element pairs.

The three parallel snubber circuits 132, 133, and 134 respectively include first snubber capacitor pairs 132a, 133a, and 134a, second snubber capacitor pairs 132b, 133b, and 134b, and third snubber capacitor pairs 132c, 133c, and 134c that are connected in parallel. Each of the first snubber capacitor pairs, the second snubber capacitor pairs, and the third snubber capacitor pairs is provided from two capacitors connected in series. The electrostatic capacitance of each of the two capacitors of the first snubber capacitor pair is 0.1 [μF]. The electrostatic capacitance of each of the two capacitors of the second snubber capacitor pair is 0.01 [μF]. The electrostatic capacitance of each of the two capacitors of the third snubber capacitor pair is 1000 [pF].

According to the control substrate having such a configuration, each of the three parallel snubber circuits 132, 133, and 134 is able to absorb noise of a plurality of frequency bands using a plurality of the snubber capacitors, of which electrostatic capacitances are different, connected in parallel.

The control substrate 101 includes a U-phase snubber circuit 135 that is connected in parallel with one end of the U-phase first MOSFET 126a of the U-phase switching element pair and the other end of the U-phase second MOSFET 126b. The U-phase snubber circuit 135 includes a resistor and a capacitor connected in series.

The control substrate 101 includes a V-phase snubber circuit 136 that is connected in parallel with one end of the V-phase first MOSFET 127a of the V-phase switching element pair and the other end of the V-phase second MOSFET 127b. The V-phase snubber circuit 136 includes a resistor and a capacitor connected in series.

The control substrate 101 includes a W-phase snubber circuit 137 that is connected in parallel with one end of the W-phase first MOSFET 128a of the W-phase switching element pair and the other end of the W-phase second MOSFET 128b. The W-phase snubber circuit 137 includes a resistor and a capacitor connected in series.

In such a configuration, the U-phase snubber circuit 135 inhibits noise input to the two MOSFETs 126a and 126b from the motor side at a position close to the two MOSFETs 126a and 126b of the U-phase switching element pair. In addition, the V-phase snubber circuit 136 inhibits noise input to the two MOSFETs 127a and 127b from the motor side at a position close to the two MOSFETs 127a and 127b of the V-phase switching element pair. Furthermore, the W-phase snubber circuit 137 inhibits noise input to the two MOSFETs 128a and 128b from the motor side at a position close to the two MOSFETs 128a and 128b of the W-phase switching element pair. Thus, according to the control substrate 101, the following effects are able to be acquired. Noise input to the six MOSFETs 126a, 126b, 127a, 127b, 128a, and 128b is able to be reduced more than in a conventional configuration in which a snubber circuit is disposed at a position far from two switching element pairs among three switching element pairs.

<Operation and Effect of Motor-Driven Oil Pump 1>

(1) The control substrate 101 includes the U-phase switching element pairs 126a and 126b that are provided from pairs of MOSFETs connected in series and individually turn on/off U-phase outputs of the three-phase power supply. In addition, the control substrate 101 includes the V-phase switching element pairs 127a and 127b that are provided from pairs of MOSFETs connected in series and individually turn on/off V-phase outputs of the three-phase power supply. Furthermore, the control substrate 101 includes the W-phase switching element pairs 128a and 128b that are provided from pairs of MOSFETs connected in series and individually turn on/off W-phase outputs of the three-phase power supply. In addition, the control substrate 101 includes snubber circuits connected in parallel with the U-phase switching element pair, the V-phase switching element pair, and the W-phase switching element pair. The control substrate 101 includes at least three parallel snubber circuits as the snubber circuits described above, and each of the parallel snubber circuits 132, 133, and 134 is connected in parallel with the U-phase switching element pairs 126a and 126b, the V-phase switching element pairs 127a and 127b, and the W-phase switching element pairs 128a and 128b.

In such a configuration, one 132 of at least three parallel snubber circuits is disposed near the U-phase switching element pairs 126a and 126b and effectively inhibits noise input to the U-phase switching element pairs 126a and 126b. Another one 133 of the three parallel snubber circuits is disposed near the V-phase switching element pairs 127a and 127b and effectively inhibits noise input to the V-phase switching element pairs 127a and 127b. In addition, the other one 134 of the three parallel snubber circuits is disposed near the W-phase switching element pairs 128a and 128b and effectively inhibits noise input to the W-phase switching element pairs 128a and 128b. Thus, according to the control substrate 101, noise input to the three switching element pairs is able to be reduced more than in a conventional configuration in which a snubber circuit is disposed at a position far from two switching element pairs among three switching element pairs.

(2) Each of the at least three snubber circuits 132, 133, and 134 included in the configuration of (1) described above includes a plurality of snubber capacitors that are connected in parallel with each other and have different electrostatic capacitances.

According to such a configuration, each of the at least three snubber circuits 132, 133, and 134 is able to absorb noise of a plurality of frequency bands using the plurality of snubber capacitors that are connected in parallel and have different electrostatic capacitances.

(3) The control substrate 101 includes the U-phase switching element pairs 126a and 126b that are provided from pairs of MOSFETs connected in series and individually turn on/off U-phase outputs of the three-phase power supply. In addition, the control substrate 101 includes the V-phase switching element pairs 127a and 127b that are provided from pairs of MOSFETs connected in series and individually turn on/off V-phase outputs of the three-phase power supply. Furthermore, the control substrate 101 includes the W-phase switching element pairs 128a and 128b that are provided from pairs of MOSFETs connected in series and individually turn on/off W-phase outputs of the three-phase power supply. In addition, the control substrate 101 includes the U-phase snubber circuit 135 that is connected in parallel with one end of one MOSFET of the U-phase switching element pairs 126a and 126b and the other end of the other MOSFET. Furthermore, the control substrate 101 includes the V-phase snubber circuit 136 that is connected in parallel with one end of one MOSFET of the V-phase switching element pairs 127a and 127b and the other end of the other MOSFET. In addition, the control substrate 101 includes the W-phase snubber circuit 137 that is connected in parallel with one end of one MOSFET of the W-phase switching element pairs 128a and 128b and the other end of the other MOSFET.

In such a configuration, the U-phase snubber circuit 135 inhibits noise input to the two MOSFETs 126a and 126b from the motor side at a position close to the two MOSFETs 126a and 126b of the U-phase switching element pairs 126a and 126b. In addition, the V-phase snubber circuit 136 inhibits noise input to the two MOSFETs 127a and 127b from the motor side at a position close to the two MOSFETs 127a and 127b of the V-phase switching element pairs 127a and 127b. Furthermore, the W-phase snubber circuit 137 inhibits noise input to the two MOSFETs 128a and 128b from the motor side at a position close to the two MOSFETs 128a and 128b of the W-phase switching element pairs 128a and 128b. Therefore, according to the control substrate 101, noise input to the switching element pairs 126a, 126b, 127a, 127b, 128a, and 128b for respective phases is able to be reduced more than in a conventional configuration in which only one snubber circuit is included.

(4) The control substrate 101 has the configuration of (3) described above. In addition, the control substrate 101 includes a parallel snubber circuit (for example, 134). The parallel snubber circuit (for example, 134) is connected in parallel with the U-phase switching element pairs 126a and 126b, the V-phase switching element pairs 127a and 127b, and the W-phase switching element pairs 128a and 128b.

In such a configuration, in accordance with the snubber circuits 135, 136, and 137 for respective phases, in addition to individual inhibition of noise input to the switching element pairs 126a, 126b, 127a, 127b, 128a, and 128b for respective phases from the motor side, the following operations and effects are acquired. The parallel snubber circuit (for example, 134) inhibits noise input to the switching element pairs 126a, 126b, 127a, 127b, 128a, and 128b for respective phases. With this, noise input to the switching element pairs 126a and 126b, 127a and 127b, and 128a and 128b for respective phases is able to be reduced more effectively.

(5) The control substrate 101 includes at least three parallel snubber circuits 132, 133, and 134 in addition to the configuration of (4) described above. The at least three parallel snubber circuits 132, 133, and 134 are respectively connected in parallel with the U-phase switching element pairs 126a and 126b, the V-phase switching element pairs 127a and 127b, and the W-phase switching element pairs 128a and 128b.

In such a configuration, one 132 of the at least three parallel snubber circuits is disposed near the U-phase switching element pairs 126a and 126b and effectively inhibits noise input to the U-phase switching element pairs 126a and 126b. Another one 133 of the three parallel snubber circuits is disposed near the V-phase switching element pairs 127a and 127b and effectively inhibits noise input to the V-phase switching element pairs 127a and 127b. In addition, the other one 134 of the three parallel snubber circuits is disposed near the W-phase switching element pairs 128a and 128b and effectively inhibits noise input to the W-phase switching element pairs 128a and 128b. As a result, according to the control substrate 101, noise input to the switching element pairs 126a, 126b, 127a, 127b, 128a, and 128b for respective phases is able to be reduced more effectively.

(6) Each of the at least three parallel snubber circuits 132, 133, and 134 in the configuration of (5) described above includes a plurality of snubber capacitors that are connected in parallel and have different electrostatic capacitances.

According to such a configuration, each of the at least three parallel snubber circuits 132, 133, and 134 is able to absorb noise of a plurality of frequency bands using a plurality of the snubber capacitors that are connected in parallel and have different electrostatic capacitances.

(7) The motor-driven oil pump includes the pump part 40, the motor part 10 that is a drive source of the pump part 40, and the control substrate 101 controlling the driving of the motor part 10. The control substrate 101 has the configuration of any one of (1) to (6) described above.

According to such a configuration, occurrence of noise input to the switching element pairs 126a, 126b, 127a, 127b, 128a, and 128b for respective phases in the control substrate 101 is able to be effectively inhibited.

In addition, any one side of the at least three parallel snubber circuits 132, 133, and 134 and the snubber circuits 135, 136, and 137 for respective phases may be provided. Also in such a configuration, noise input to the switching element pairs 126a, 126b, 127a, 127b, 128a, and 128b for respective phases is able to be reduced more effectively than in a conventional configuration.

Figure 4:
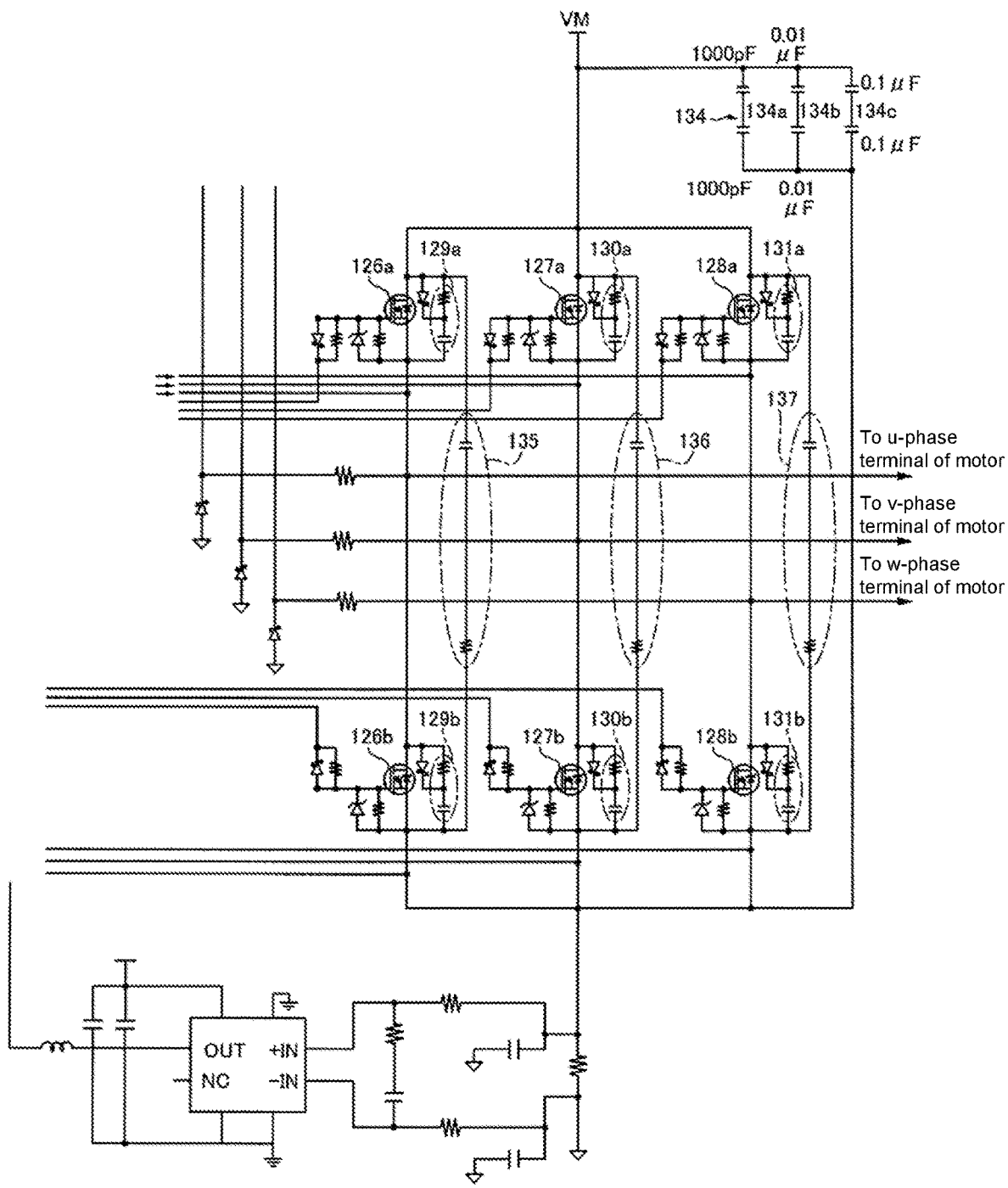
FIG. 4 is a circuit diagram illustrating a part of a circuit of a control substrate in an inverter of a motor-driven oil pump of a modified example.

Although an example in which the three parallel snubber circuits 132, 133, and 134 are disposed in addition to the snubber circuits 135, 136, and 137 for respective phases has been described, as illustrated in FIG. 4, only one parallel snubber circuit 134 or only two parallel snubber circuits may be disposed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A motor driving control substrate comprising:
a first-phase switching element pair comprising a pair of switching elements connected in series and configured to individually turn on/off outputs of a first phase in a three-phase power supply;
a second-phase switching element pair comprising a pair of switching elements connected in series and configured to individually turn on/off outputs of a second phase in the three-phase power supply;
a third-phase switching element pair comprising a pair of switching elements connected in series and configured to individually turn on/off outputs of a third phase in the three-phase power supply; and
a snubber circuit,
wherein the snubber circuit comprises parallel snubber circuit connected in parallel with each of the first-phase switching element pair, the second-phase switching element pair, and the third-phase switching element pair,
wherein the number of the parallel snubber circuits is at least three, and
wherein each of the at least three parallel snubber circuits comprises a plurality of snubber capacitors that are connected in parallel and have different electrostatic capacitances.

2. A motor-driven oil pump comprising:
a pump part;
a motor part configured as a drive source of the pump part; and
a motor driving control substrate configured to control driving of the motor part, wherein the motor driving control substrate is the motor driving control substrate according to claim 1.

* * * * *